(12) United States Patent
Srivastava et al.

(10) Patent No.: US 11,122,501 B2
(45) Date of Patent: Sep. 14, 2021

(54) ACCESS PRIORITIZATION FOR PRIVATE LTE RADIO SERVICE

(71) Applicant: Cisco Technology, Inc., San Jose, CA (US)

(72) Inventors: Vimal Srivastava, Bangalore (IN); Indermeet Singh Gandhi, San Jose, CA (US); Sangram Kishore Lakkaraju, Bangalore (IN); Sri Gundavelli, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/672,123

(22) Filed: Nov. 1, 2019

(65) Prior Publication Data
US 2021/0136666 A1    May 6, 2021

(51) Int. Cl.
*H04W 4/00* (2018.01)
*H04W 48/16* (2009.01)
*H04W 28/02* (2009.01)

(52) U.S. Cl.
CPC ....... *H04W 48/16* (2013.01); *H04W 28/0247* (2013.01)

(58) Field of Classification Search
CPC .... H04L 69/321; H04W 12/04; H04W 12/06; H04W 76/12; H04W 80/02; H04W 80/04; H04W 88/06; H04W 88/12
See application file for complete search history.

(56) References Cited

U.S. PATENT DOCUMENTS

| | | | |
|---|---|---|---|
| 5,909,701 A | 6/1999 | Jeddeloh | |
| 9,699,088 B2 | 7/2017 | Roy et al. | |
| 9,854,588 B2 | 12/2017 | Veerepalli et al. | |
| 2007/0150732 A1* | 6/2007 | Suzuki | H04W 12/06 713/168 |
| 2008/0200146 A1 | 8/2008 | Wang et al. | |
| 2011/0201307 A1 | 8/2011 | Segura | |
| 2013/0203460 A1 | 8/2013 | Johnson et al. | |

(Continued)

FOREIGN PATENT DOCUMENTS

| | | |
|---|---|---|
| CN | 103491597 | 5/2016 |
| WO | 2017128270 | 8/2017 |

OTHER PUBLICATIONS

International Search Report and Written Opinion from the International Searching Authority, dated Jan. 25, 2021, 14 pages, for corresponding International Patent Application No. PCT/US2020/057003.

*Primary Examiner* — Khalid W Shaheed
(74) *Attorney, Agent, or Firm* — Polsinelli

(57) ABSTRACT

Systems and methods for providing access prioritization to a private Long Term Evolution (LTE) network operating in a Citizens Broadband Radio Service (CBRS) spectrum include receiving, at a network device of the private Long Term Evolution (LTE) network, a functional group associated with a user equipment (UE) and a traffic load of a cell of the private LTE network associated with the UE. An access priority associated with the functional group and the traffic load is determined and provided to a CBRS access point (AP) which controls access to the cell. The access priority indicates to the CBRS AP a priority with which the UE is allowed to access the cell and can include a high priority, a low priority, or no access indication.

20 Claims, 7 Drawing Sheets

(56) References Cited

U.S. PATENT DOCUMENTS

| | | | |
|---|---|---|---|
| 2018/0213278 A1* | 7/2018 | Choi | H04L 47/10 |
| 2019/0007889 A1* | 1/2019 | Jayawickrama | H04W 16/14 |
| 2019/0104489 A1* | 4/2019 | Huang | H04W 60/00 |
| 2019/0115950 A1* | 4/2019 | Kakinada | H04B 1/7176 |
| 2020/0029222 A1* | 1/2020 | Mueck | H04B 1/7136 |
| 2020/0037175 A1* | 1/2020 | Sevindik | H04W 72/04 |

\* cited by examiner

ACCESS PRIORITIZATION FOR PRIVATE LTE RADIO SERVICE

TECHNICAL FIELD

The present technology pertains to enterprise networks, and more specifically to prioritization of access to private Long Term Evolution (LTE) service in a Citizens Broadband Radio Service (CBRS) spectrum, based on enterprise group affiliation.

BACKGROUND

The Citizen Broadcast Radio Service (CBRS) is a 150 MHz wide spectrum in the 3550-3700 MHz frequency range in the United States. Some of this spectrum is used by the United States government for their radar systems. When portions of the spectrum are not in use, those portions can be made available for use by other entities. The Federal Communications Commission (FCC) created rules for commercial use of the CBRS spectrum. Enterprises can use this CBRS spectrum to set up private Long-term Evolution (LTE) networks and allow access to consumer and Internet of Things (IoT) devices. Enterprises may expand and increase the coverage density of private LTE networks by integrating CBRS into their wireless connectivity services. CBRS style shared spectrum in some other bands is also being planned in Europe and some other parts of the world.

The CBRS spectrum use is governed by a three-tiered spectrum authorization framework (incumbent access, priority access, general authorized access) to accommodate a variety of commercial uses on a shared basis with incumbent federal and non-federal users of the band. Incumbent access users include authorized federal and grandfathered fixed satellite service users. Priority access consists of priority access licenses assigned to competitive bidding within the band. Lastly, general authorized access is licensed-by-rule to permit open, flexible access to any portion of the band not assigned to any of the two higher tiers with respect to the widest possible group of potential users. The access and operations for the band across the three different tiers are managed by a dynamic spectrum access system (SAS).

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
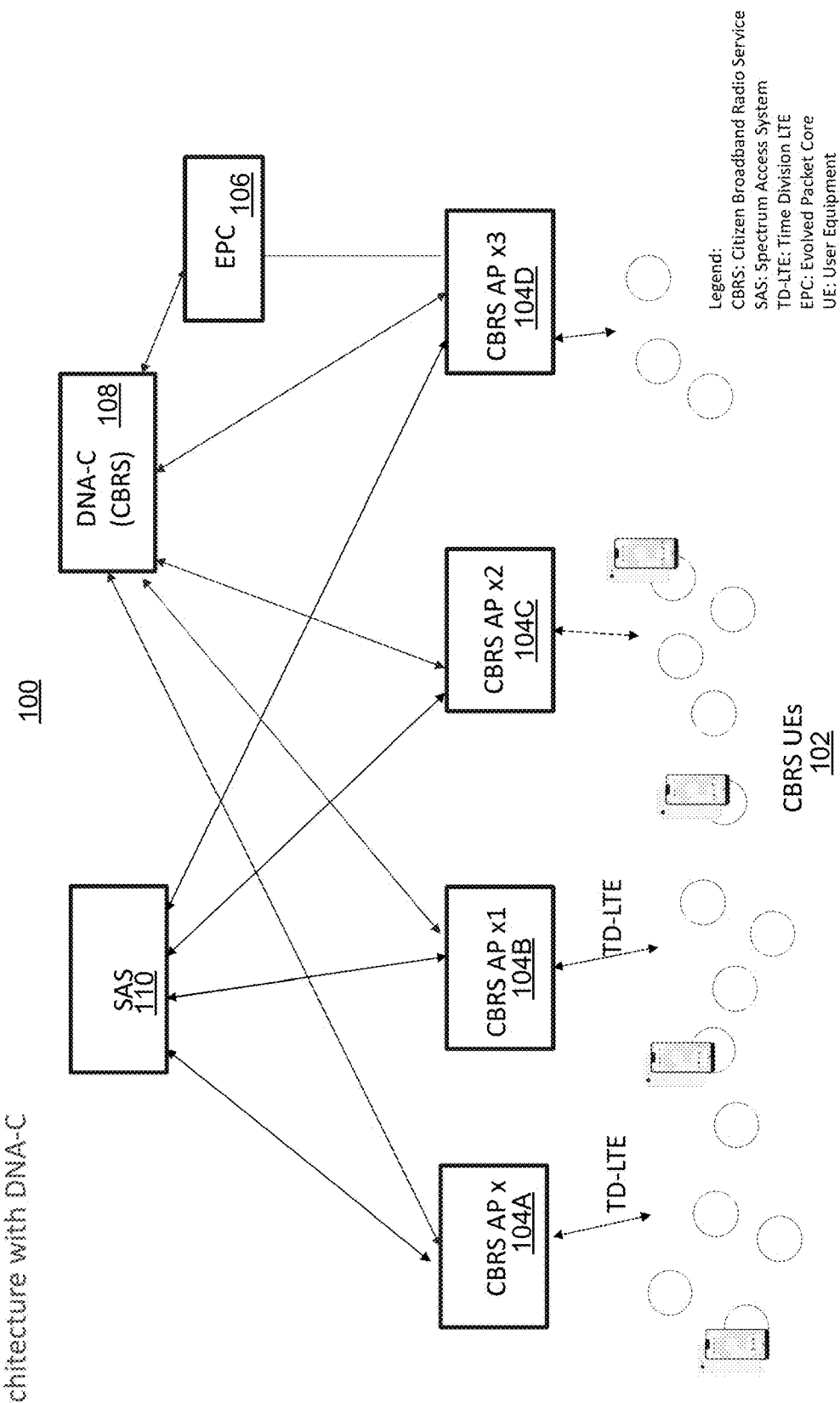
FIG. 1 illustrates an example CBRS network architecture according to aspects of this disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed herein are systems, methods, and computer-readable media for providing access prioritization to one or more devices to connect to a private LTE network in a CBRS spectrum based on functional groups associated with the one or more devices. In some examples, an employee or enterprise functional group is associated with a cell identifier (ID) of a user equipment (UE). Based on the functional group of the cell to which the UE is associated with, the UE may be allowed or prevented from latching on to the cell. Moreover, depending upon the functional group, the UE may be provided with preferential access of the cell.

In an example implementation, the Enterprise's authentication, authorization, and accounting (AAA) server is configured with the UE's functional group. A Digital Network Architecture (DNA) appliance is configured with the access control and traffic priority based on the functional group and cell ID of the UE. The DNA appliance can also be provided with cell specific load information for making decisions about traffic priority for a given group of UEs. After a UE latches on to a CBRS cell and tries to connect to the private LTE network, the private LTE network can request the DNA appliance to provide access control and traffic priority related information for the UE. The private LTE network can provide the UE's associated functional group and cell information to the DNA appliance. The DNA appliance, based on the configured information about the group access and priority and other load information on the cell, can determine access control and traffic priority information for the UE, which can be provided to an access point (e.g., eNodeB) to effect appropriate access and priority treatment to the UE.

In some examples, a method is provided. The method comprises receiving, at a network device of a private Long Term Evolution (LTE) network operating in a Citizens Broadband Radio Service (CBRS) spectrum, a functional group associated with a user equipment (UE); receiving, at the network device, a traffic load of a cell of the private LTE network associated with the UE; determining an access priority associated with the functional group and the traffic load; and providing the access priority to a CBRS access point (AP) which controls access to the cell, wherein the access priority indicates to the CBRS AP a priority with which the UE is allowed to access the cell.

In some examples, a system is provided, the system comprising: one or more processors; and a non-transitory computer-readable storage medium containing instructions which, when executed on the one or more processors, cause the one or more processors to perform operations including: receiving, at a network device of a private Long Term Evolution (LTE) network operating in a Citizens Broadband Radio Service (CBRS) spectrum, a functional group associated with a user equipment (UE); receiving, at the network device, a traffic load of a cell of the private LTE network associated with the UE; determining an access priority associated with the functional group and the traffic load; and providing the access priority to a CBRS access point (AP) which controls access to the cell, wherein the access priority indicates to the CBRS AP a priority with which the UE is allowed to access the cell.

In some examples, a non-transitory machine-readable storage medium is provided, including instructions configured to cause a data processing apparatus to perform operations including: receiving, at a network device of a private Long Term Evolution (LTE) network operating in a Citizens Broadband Radio Service (CBRS) spectrum, a functional group associated with a user equipment (UE); receiving, at the network device, a traffic load of a cell of the private LTE network associated with the UE; determining an access priority associated with the functional group and the traffic load; and providing the access priority to a CBRS access point (AP) which controls access to the cell, wherein the access priority indicates to the CBRS AP a priority with which the UE is allowed to access the cell.

In some examples, the access priority comprises a high priority, a low priority, or no access indication.

In some examples, the access priority for the UE comprises the no access indication if the UE is authenticated to attach to the cell and one or more UEs of functional groups with higher priority consume the traffic load of the cell.

In some examples, the no access indication is temporary for a period of time until the traffic load of the cell decreases.

In some examples, providing the access priority to the CBRS AP includes providing the access priority to a mobility management entity (MME) of the private LTE network, wherein the functional group is received from the MME based on the UE establishing a request to attach to the cell.

In some examples, the network device is a Digital Network Architecture (DNA) appliance of the private LTE network.

Some examples further comprise receiving o a user profile and subscription information associated with the UE from one or more authentication, authorization, and accounting (AAA) servers of the private LTE network. In some examples, the one or more AAA servers comprise a CBRS AAA server and an enterprise AAA server.

DESCRIPTION OF EXAMPLE EMBODIMENTS

The disclosed technologies address the need in the art for prioritized access to Private LTE Radio service. Such access prioritization is recognized as a desirable feature in some operating environments using the CBRS spectrum. For example, in an enterprise network, a user's (or UE's) enterprise group affiliation can form a basis for determining both access to a network cell as well as prioritization of the access over users of other groups. For example, considering an automobile manufacturer with many diverse functional areas and with a mix of users and Internet of Things (JOT) devices (e.g., robots) moving between CBRS cells, it may be desirable to ensure that certain groups of users have higher priority in certain locations over other groups. For example, a robot equipped with CBRS access may be deemed to have higher priority than a user accessing the network for streaming media content. Such prioritization can provide the enterprise network with a capability is to ensure that network access is fully utilized while still guaranteeing connectivity to certain high priority users.

In some examples, users belonging to a particular group (e.g., a Digital Network Architecture Center (DNA-C) group) can be deemed to have higher priority for CBRS network access in a certain location over users belonging to other groups. In existing CBRS spectrum utilization rules, a unique CBRS-Network identifier (CBRS-NID) is provided for each enterprise deploying a CBRS Private LTE network. Additionally, all CBRS networks have a common, Shared Home Network Identifier (SHNI), where in some cases the SHNI value is "315-010". The above two identifiers CBRS-NID and SHNI uniquely identify a CBRS enterprise network. According to currently defined access provisions, all UEs belonging to an enterprise and having a profile which matches the CBRS-NID and SHNI of that enterprise (with other valid authentication credentials in some cases), can be allowed access to the enterprise network. According to example aspects, improvements are provided over the currently defined access provisions, where these improvements can both allow/disallow access, as well as prioritize access (when allowed) to certain group of UEs (e.g., based on their functional group IDs as mentioned above).

FIG. 1 illustrates an example deployment of a CBRS network 100. In the CBRS network 100, the CBRS spectrum can be used with 4G LTE technology to support private LTE networks. Similar to LTE networks, the CBRS network 100 can include an eNodeB, Core Network for Packet services and IMS for voice and multimedia services. In addition to the traditional LTE networks, the CBRS network 100 can include an additional node shown as a Spectrum Access System (SAS) 110 to manage and control access to the CBRS network 100. The SAS 110 can be implemented using a three-tier spectrum authorization framework to accommodate a variety of commercial uses on a shared basis with incumbent federal and non-federal users of the CBRS band.

The CBRS network 100 can be accessed by one or more UEs 102, identified as CBRS UEs. The UEs 102 can include various computing and networking devices such as mobile devices, laptops, desktops, etc. One or more access points, identified as CBRS APs 104A-D, for example, can control and provide network access to the UEs 102. In some examples, the CBRS APs 104A-D can include an Evolved Node B (eNodeB), a CBRS base stations or CBRS device (CBSD), etc. The CBRS APs 104A-D can belong to different networks or enterprises, e.g., a private LTE network, and may communicate directly with UEs 102 of that network. The CBRS APs 104A-D, CBSDs or eNodeBs configured to support the CBRS band can be categorized into two types: CBSD-Category A and CBSD-Category B The SAS 110 can manage the three-tier license structure for the following types of access. A first access license referred to as an Incumbent Access (IA) is an access license used by the US Navy and also for fixed satellite services (FSS). The IA access has absolute priority over other type of allocation.

A second access license referred to as a Priority Access License (PAL) is an access license which can be used by hospitals, utilities and government departments as well as non-critical users such as mobile network operators (MNOs). The PAL is assigned using competitive bidding to various enterprises and commercial users within the 3550-3650 MHz frequency block of the CBRS spectrum. Each access license under the PAL is defined as a non-renewable authorization to use a 10 megahertz channel in a single census tract (e.g., in a contained location or small geographic area/district) for a fixed period, e.g., three years. Up to seven total PALs may be assigned in any given census tract with up to four PALs being granted to any single applicant. Applicants may acquire up to two consecutive PAL terms in any given license area during the first auction.

A third access license referred to as a General Authorized Access (GAA) is provided to users can potentially have access to all 150 megahertz in the 3550-3700 MHz spectrum. GAA users are permitted to use any portion of the 3550-3700 MHz band not assigned to a higher tier user and may also operate opportunistically on unused Priority Access channels.

The SAS 110 can control operation of the CBRS APs 104A-D based on the three-tiered licensing model. In some examples the SAS 110 can inform the CBRS APs 104A-D of frequency bands or channels to use in the CBRS spectrum and transmit/receive powers for any specific time or time period. An interface between the SAS 110 and the CBRS APs 104A-D can be based on the HTTP over Transport Layer Security (HTTP-TSL) protocol. The interface can include exchanges of messages for the following operations: a CBSD Registration Request/Response, a Spectrum Inquiry Request/Response, a Grant Request/Response, and a Heartbeat Request/Response When the CBRS APs 104A-D get powered on, they start the SAS-CBSD registration procedure with the SAS 110 to gain access to the CBRS spectrum. For example, the CBRS APs 104A-D send their respective Registration Requests (along with other parameters required by the SAS 110). After a Registration Response from the SAS 110 indicating a successful registration, the CBRS APs 104A-D perform the Spectrum Inquiry for the available channel information from the CBRS spectrum. Upon receiving a Spectrum Inquiry Response to the Spectrum Inquiry, the CBRS APs 104A-D send a Grant Request with one of the operating channels and peak power indicated in the Spectrum Inquiry Response. The Spectrum Inquiry is an optional procedure. In case of an Spectrum Inquiry failure, the CBRS APs 104A-D can continue with a grant procedure. In response to the Grant Request, the CBRS APs 104A-D gain approval for the requested frequency channel and the peak transmit power. The CBRS APs 104A-D may also receive time period for the grant. Once the CBRS APs 104A-D reach the granted state, they initiate a heartbeat procedure and receive authorization from the SAS 110 for RF transmission.

The CBRS APs 104A-D can be provide corresponding access rules and policies to the UEs 102 for accessing the CBRS network 100 (or portion thereof) through respective CBRS APs 104A-D, where these rules and policies can include a frequency channel which has been allocated to the CBRS APs 104A-D, and according to example aspects, access permissions and priorities.

An evolved packet core (EPC) 106 can also be deployed within the CBRS network 100. The EPC 106 can provide a variety of different functions for the CBRS network 100. For example, the EPC 106 can manage session states, authenticate, and manage communication associated with access points and/or user equipment within the CBRS network 100. The EPC 106 can also be used to route communications (e.g., data packets), manage quality of service (QoS), and provide deep packet inspection (DPI) functionality within the CBRS network.

Further, the CBRS network 100 can include a digital network architecture (DNA) appliance 108, which can be configured to manage the CBRS APs 104A-D. For example, the DNA appliance 108 can obtain the assignments of each of the CBRS APs 104A-D provided by the SAS 110. In some examples, the DNA appliance 108 can monitor performance of the CBRS APs 104A-D and associated UEs 102 to detect when interference is present. In some examples, the DNA appliance 108 can determine different parameters to assign to one or more of the CBRS APs 104A-D when interference is detected, and dynamically re-assign the operational parameters of the access points to minimize and/or eliminate the detected interference. In this way, the DNA appliance 108 can resolve issues of interference between the CBRS APs 104A-D and/or the UEs 202 that the SAS 110 may not be able to account for.

Figure 2:
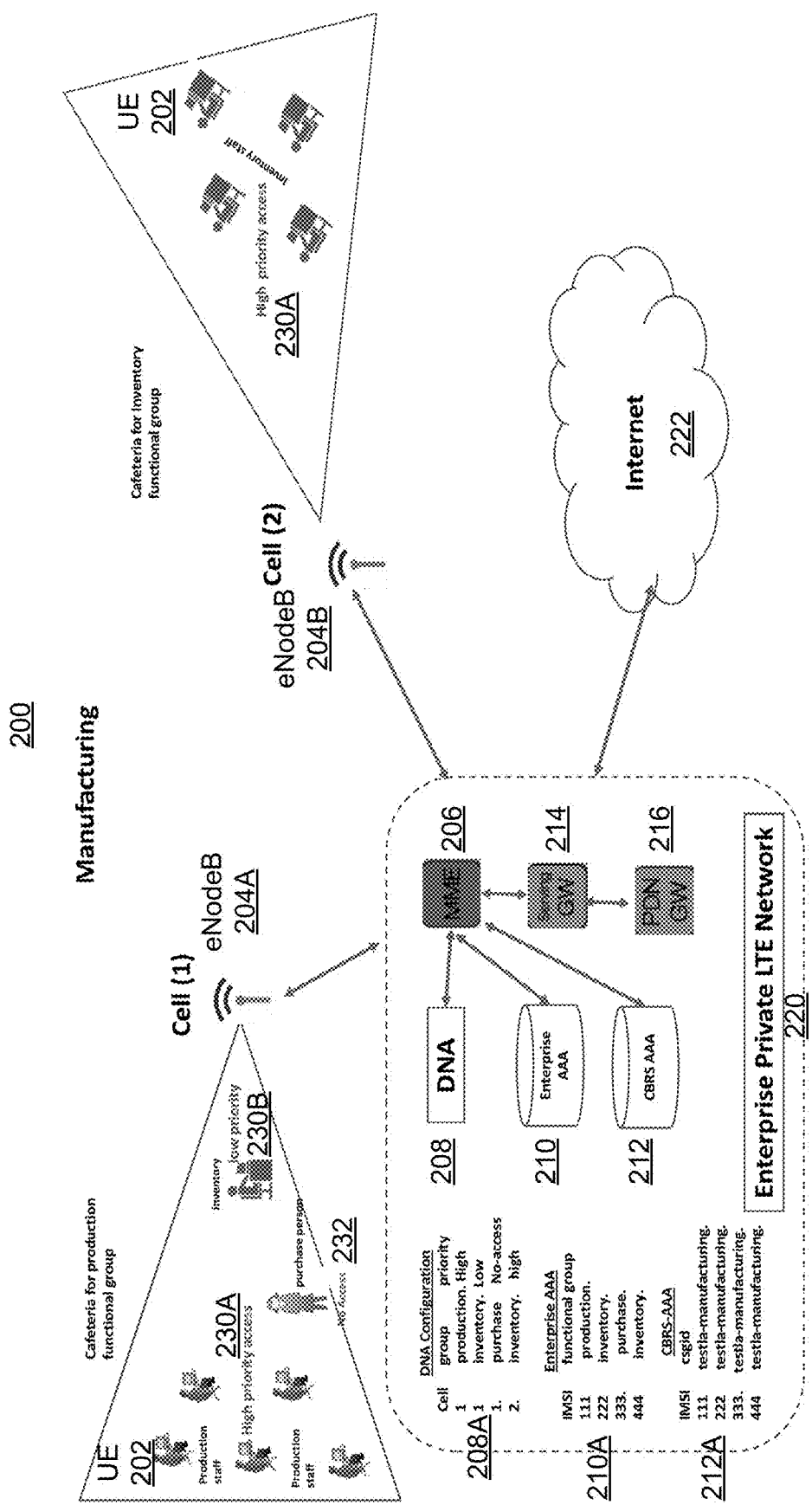
FIG. 2 a network environment for deploying a CBRS network, according to example aspects of this disclosure.

FIG. 2 illustrates an environment 200 in which the CBRS network 100 can be deployed according to example aspects of this disclosure. In an example, the environment 200 can include a manufacturing facility with various zones. The zones are shown as non-overlapping geographical locations for the sake of illustration of some example features, but the disclosed aspects are equally applicable to the zones including overlapping geographical locations. An enterprise private LTE network 220 which can be deployed using the CBRS spectrum in the environment 200 can include a SAS which can be composed of various components.

The private LTE network 220 can provide access to the CBRS spectrum (e.g., to connect to the Internet 222) for one or more cells or zones, each of which can include a respective CBSD such as the cells 1 and 2 shown with eNodeBs 204A-B, respectively (collectively, eNodeB 204). The eNodeBs 204 can provide access to UEs 202 in the respective cells 1 and 2.

In some examples, the private LTE network 220 can include a mobility management entity (MME) 206, which may be a key control-node for the private LTE network 220. The MME 206 can communicate with the eNodeBs 204 in conjunction with a Serving Gateway (S-GW) 214 within an Evolved Packet Core (EPC) or the private LTE network 220. The MME 206 can select from one or more S-GWs for a UE 202 during a time of initial attachment as well as during intra-LTE handovers involving Core Network (CN) node relocation. The MME 206 can also select a packet data network (PDN) Gateway (P-GW) such as the P-GW 216 to connect to the PDN. In various examples, the MME 206 can act as a termination point for Non-Access Stratum (NAS) signaling, and also be configured to generate and allocate temporary identities to the UEs 202.

In some examples, the MME 206 can authenticate the UEs 202 by interacting with one or more authentication, authorization, and accounting (AAA) modules such as the enterprise AAA 210 and the CBRS AAA 212 according to aspects of this disclosure. In some examples, the UEs 202 can each be associated with a respective functional group, and the enterprise AAA 210 and/or the CBRS AAA 212 can be configured to store the functional groups of the UEs 202. The functional group of a UE 202 can be tied to the cell ID (e.g., cell 1 or cell 2 in FIG. 2). Based on the functional group of the cell 1 or cell 2 to which it is tied to, a UE 202 can be allowed to latch on to or access the respective cell 1 or cell 2. Further, depending upon the functional group tied to the cell for a particular UE 202, the UE 202 may be given preferential traffic treatment while accessing the cell.

The MME 206 can also communicate with a DNA appliance 208 which can be similarly configured to provide related functionality as the DNA appliance 108. In some examples, the DNA appliance 208 can assist the MME 206 with detecting and resolving issues of interference between the eNodeBs 204 and/or the UEs 202. In some examples, the DNA appliance 208 can be configured with the access control and traffic priority based on the functional group and cell ID (e.g., cell 1 or cell 2) of the UEs 202. In some examples, the DNA appliance 208 can also be provided with cell specific load information (e.g., by the MME 206) for making decisions about traffic priority for a given functional group of UEs 202.

As shown in FIG. 2, different access priority categories are identified, including a high priority 230A, a low priority 230B or a no access 232. A UE 202 of a functional group having high priority 230A is prioritized for access over a UE 202 of a functional group having low priority 230B. In some examples, the access priority for a UE 202 associated with a functional group can be determined to be the no access 232 when one or more UEs of functional groups with higher priority consume available resources of the cell. The available resources of the cell, such as available bandwidth, can be based on the existing traffic load or bandwidth consumption of the cell. Thus, access to the cell is generally based on available resources of the cell (e.g., based on the traffic load of the cell). In some cases, the no access 232 can be temporary and withdrawn if the traffic load of the cell decreases after a period of time.

When a UE 202 latches on (or attaches) to one of the cells (cell 1 or cell 2) and tries to connect to the private LTE network 220, the MME 206 can request the DNA appliance 208 to provide access control and traffic priority related information. In various examples, the DNA appliance 208 can obtain the functional group and cell information from the private LTE network 220 (e.g., illustratively shown as DNA configuration information 208A, with related configurations 210A and 212A also shown respectively for the enterprise AAA 210 and CBRS AAA 212). The DNA appliance 208, can also obtain traffic load information in the cells. Based on the functional group and the traffic load, the DNA appliance 208 can determine an access priority for UEs belonging to the functional group and provide the MME 206 with the access control and priority information for the functional group.

In some examples, the MME 206 can notify the respective eNodeBs 204 about the priority information, so that the eNodeBs can provide appropriate treatment to the UEs 202. For example, for a UE 202 whose functional group falls within the no access 232 category in cell 1, access can be denied by the eNodeB 204A. For a group of UEs 202 within the cells 1 and 2 with high priority 230A, high priority access can be provided by respective eNodeBs 204A and 204B. Similarly, for the group of UEs within cell 1 with low priority 230B, low priority access can be provided by the eNodeB 204A (i.e., based on prioritizing the high priority 230A group of UEs 202 over the low priority 230B group of UEs 202). Prioritizing a group of UEs 202 can include providing preferential treatment of traffic to/from the UEs 202 (e.g., in the high priority 230A group). In some examples, additional priority levels (e.g., one or more medium priority categories in between the high priority 230A and low priority 230B) can also be included and prioritized in corresponding order. In some examples, an IE CsgMemberShip Info field used in the communications of packets between the various nodes (e.g., from the DNA appliance 208 to the MME 206 to the eNodeBs 204) to include priority tags, "high", "medium", "low", "reject" to indicate the different priority levels and also access permissions for the UEs 202. In some examples a cause code can be included for communicating to a UE 202 which may be in a Closed Subscriber Group (CSG) with a valid authorization, but temporary denial of connectivity due, for example, to providing available bandwidth to a higher priority group of UEs 202.

Figure 3:
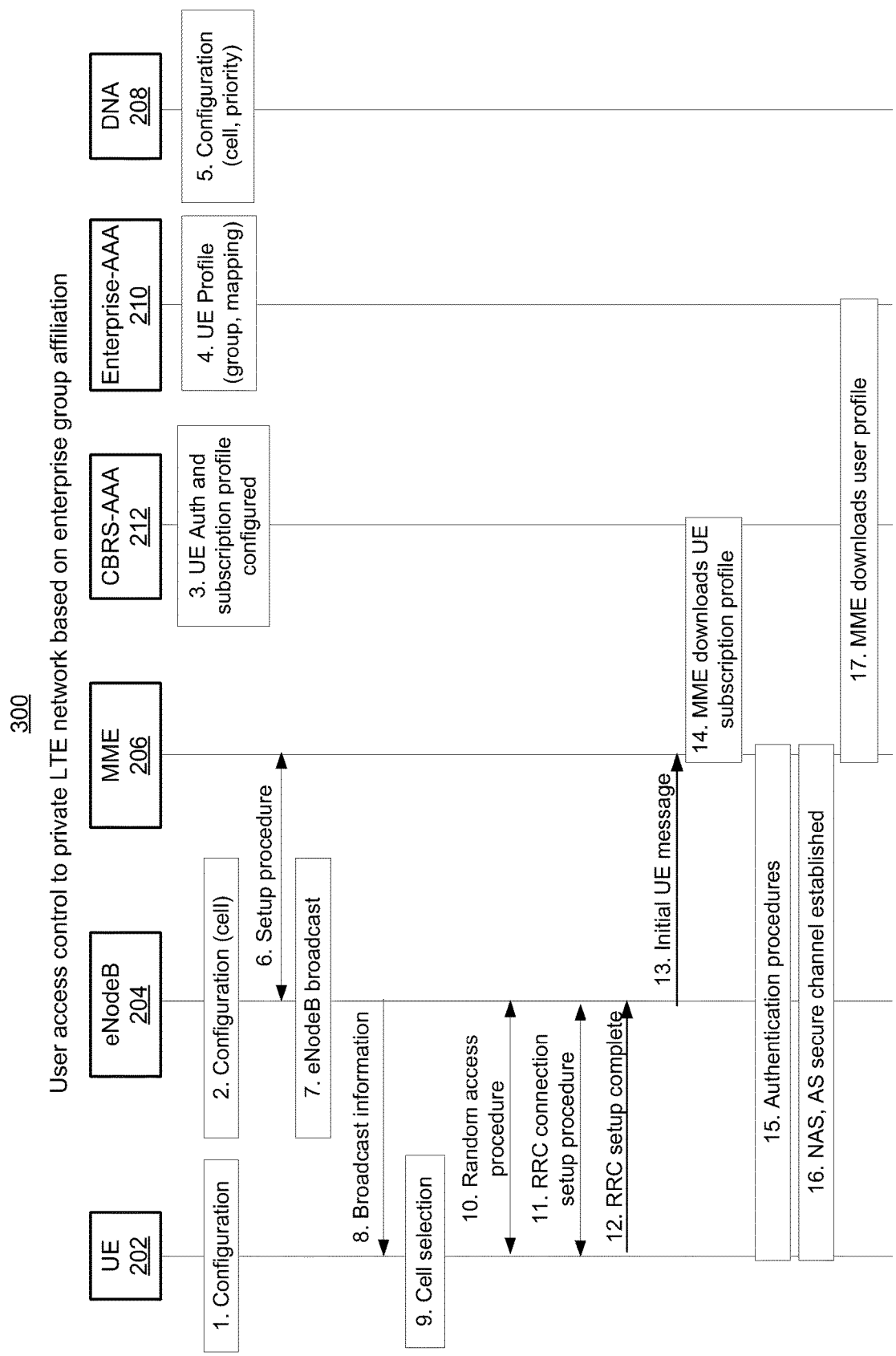
FIGS. 3 and 4 illustrate example processes for providing access prioritization based on functional groups in a CBRS network, according to example aspects of this disclosure.
Figure 4:
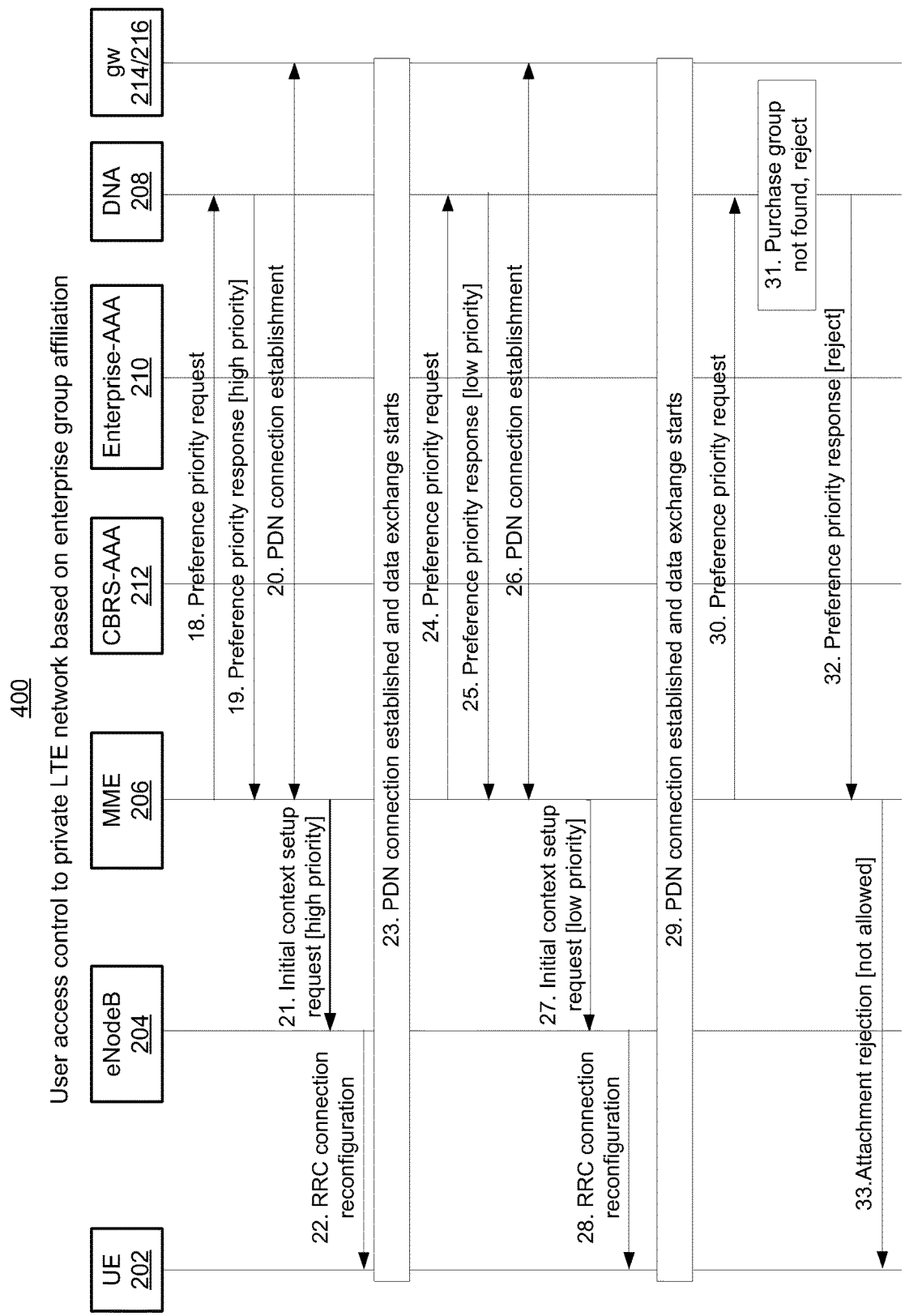

FIGS. 3-4 illustrate example processes 300 and 400 for implementing the above-described functional group based access priority in private LTE networks. In some examples, the processes 300 and 400 can be implemented in the CBRS network 100 or the environment 200. It will be understood that the steps described with reference to the processes 300 and 400 can be implemented in any order or any combination thereof, including combinations that exclude, add, or modify certain steps.

Starting with step 1 of process 300, one or more of the UEs 202 in cells 1 or 2 can provide configuration information to a respective eNodeB 204. In step 2, the eNodeB 204 can register and provide the configuration (e.g., CSG cell ID) to the MME 206. In step 3, the CBRS AAA 212 can obtain or generate UE authorization and subscription information (e.g., based on the configuration 212A for all UEs 202), which can be provided subsequently to the MME 206. In step 4, the enterprise AAA 210 can be configured with the UE subscription profiles and authentication related information, including group ID mappings (e.g., based on the configuration 210A for all UEs 202), which can be provided subsequently to the MME 206. In step 5, the DNA appliance 208 can be configured with priority of network access. For example, the DNA appliance 208 can be configured with information and priorities related to groups of UEs (e.g., based on the configuration 208A for the UEs 202), which can be provided subsequently to the MME 206.

In step 6, the eNodeB 204 connects to the MME 206 (e.g., using a S1 setup procedure) and informs the MME 206 about supported shared home network identifier (SHNI), closed subscriber group (CSG) lists, etc. In step 7, the eNodeB can broadcast the information for evaluating whether a UE 202 can access a cell, e.g., in the form of master information block (MIB), system information block (SIB), etc.

The UEs 102 may be associated with a Public Land Mobile Network (PLMN). A PLMN may be uniquely identified by a PLMN identifier (PLMN ID). A PLMN ID may include a mobile country code (MCC) and a mobile network code (MNC). The UEs can be configured with a private enterprise PLMN ID and different authentication modes. In some examples, the UEs can perform PLMN selection and may attach to one of the CBSDs or eNodeBs 204 of the private LTE network 220, using a CBRS band. For example, in step 8, the eNodeBs 204 can broadcast information which is received by the UEs 202, where the information can include the PLMNs from the broadcast in step 7. In step 9, the UEs 202 can perform a cell selection by comparing the PLMN IDs and CSGs and selecting a cell which supports the SHNI.

For UEs 202 which may wish to attach to a particular eNodeB 204, steps 10-12 show attachment processes. The attachment processes can include a random access procedure in step 10, a Radio Resource Control (RRC) in step 11, and RRC setup completion in step 12, upon which the UE 202 may have established intent to attach with the eNodeB 204. In step 13, the attachment request for the UE 202 can be forwarded from the eNodeB 204 to the MME 206. In step 14, the MME 206 can download a subscription profile for the UE 202 from the CBRS AAA 212.

In step 15, the MME 206 and/or the CBRS AAA can perform initial authentication and security procedures. For example, whether the UE 202 is allowed to attach or not can be determined in this step 15 (keeping in mind that this is different from the no access 232 priority which is a determination which is performed subsequently for a UE 202 which can attach but may be denied access due to other high priority accesses which may exhaust available bandwidth). If the UE 202 is allowed to attach, then in the step 16, the MME 206 can establish a channel for possibly communicating with the UE 202.

In the step 17, the MME can download or collect the configuration and priority information generated or obtained in the steps 3-5 for the UE 202. For example, the information from the CBRS AAA 212, the enterprise AAA 210, and the DNA appliance 208 obtained in the steps 3-5 above can be referred to as a user profile which can include the functional group ID of the UE 202. The MME 206 can determine the functional group of the UE 202 based on its user profile in this step.

Referring to FIG. 4, the process 300 of FIG. 3 can continue to the process 400 of FIG. 4, starting with step 18, where the MME 206 can provide the functional group determined for the UE 202 in step 17 to the DNA appliance 208. The DNA appliance 208 can consult its mapping table or configuration 208A for example (or refer to step 5 of FIG. 3) to obtain the priority (e.g., high priority 230A or low priority 230B) for the UE 202 and provide the priority to the MME 206. In step 20, the MME 206 can also establish a PDN connection with one of the gateways S-GW 214 or P-GW 216. Based on this, the MME 206 can provide an initial context and setup along with the priority of the UE 202 to the eNodeB 204 in step 21.

In step 22, the eNodeB 204 can send an RRC connection reconfiguration (or an acceptance of the attachment request in step 12) to the UE 202, for which a high priority has been identified in this example. In step 23, the PDN connection establishment is performed for the high priority access of the UE 202. Steps 24-29 are similar to the steps 18-23 discussed above, for the case of a low priority access. The steps 24-29 may be performed as an alternative to the steps 18-23 in some cases.

Steps 30-33 correspond to a case where the UE 202 is denied access based on its associated functional group, keeping in mind once again that this is a case where the UE 202 is allowed to attach but may be denied access (e.g., on a temporary basis due to the traffic load). The steps 30-33 may be performed as an alternative to the steps 18-29 in some cases. In step 30, the MME 206 can provide the functional group determined for the UE 202 in step 17 to the DNA appliance 208. The DNA appliance 208 can consult its configuration 208A for example (or refer to step 5 of FIG. 3) to obtain the priority (e.g., high priority 230A or low priority 230B) for the UE 202 and provide the priority to the MME 206. In step 31, either a priority may not be found to be associated with the functional group or the priority may indicate no access. Based on this, the DNA appliance 208 can inform the MME 206 that the UE 202 is to be rejected in step 32, which can be communicated to the UE in step 33.

Figure 5:
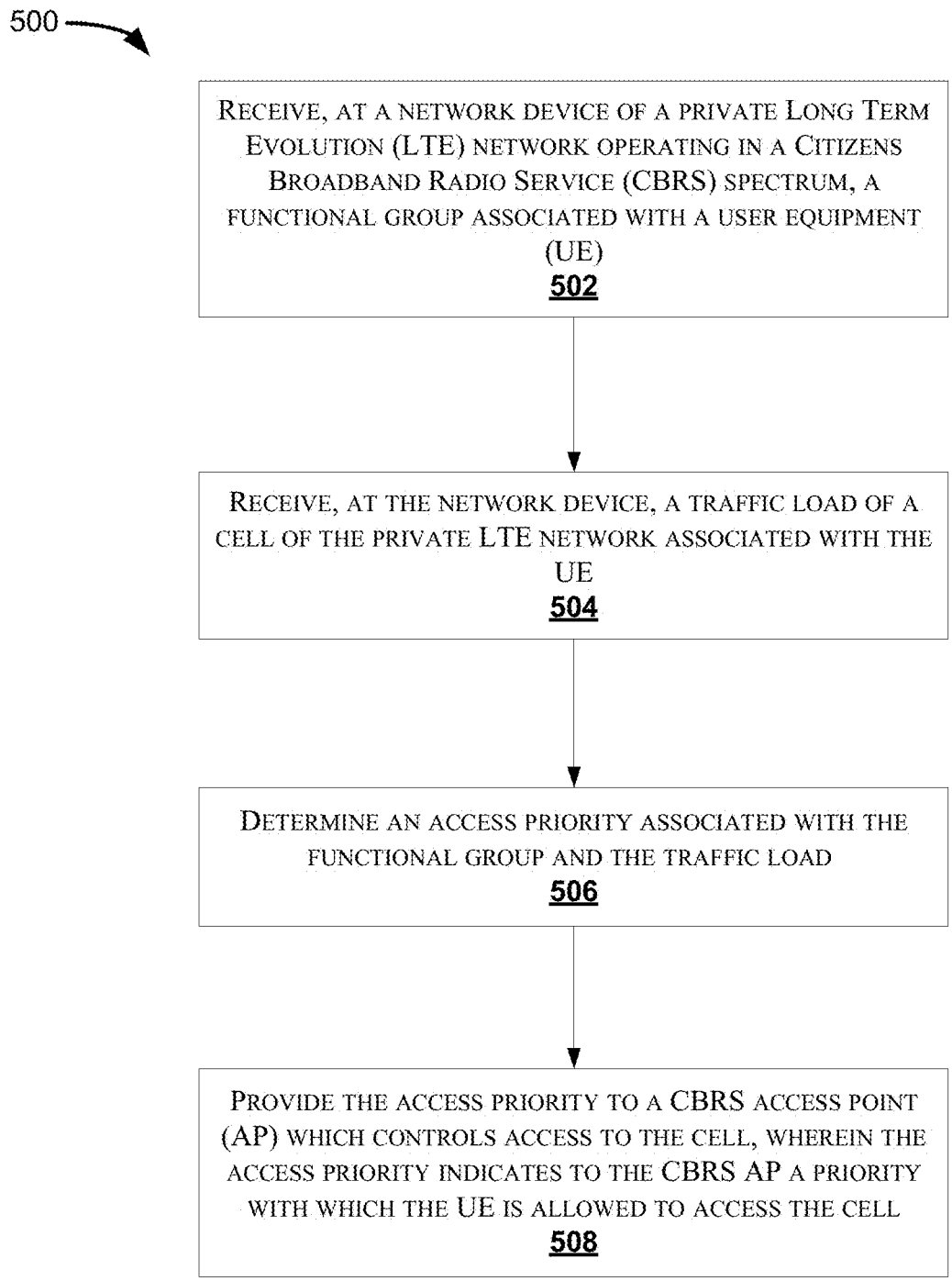
FIG. 5 illustrates another process for providing access prioritization based on functional groups in a CBRS network, according to aspects of this disclosure.

Having described example systems and concepts, the disclosure now turns to the process 500 illustrated in FIG. 5. The steps or blocks outlined herein are examples and can be implemented in any combination thereof, including combinations that exclude, add, or modify certain steps.

At block 502, the process 500 can include receiving, at a network device of a private Long Term Evolution (LTE) network operating in a Citizens Broadband Radio Service (CBRS) spectrum, a functional group associated with a user equipment (UE). For example, the DNA appliance 208 of the private LTE network 220 can receive (e.g., at steps 18, 24, 30), a request from the MME 206 which contains a functional group associated with a UE 202 which has attached to a cell.

At block 504, the process 500 can include receiving, at the network device, a traffic load of a cell of the private LTE network associated with the UE. For example, the traffic load of the cells 1 and 2 of the environment 200 can be obtained from the eNodeBs 204.

At block 506, the process 500 can include determining an access priority associated with the functional group and the traffic load. For example, based on the configuration 208A and the traffic load, the DNA appliance can obtain the priority for the UE 202 (e.g., as shown in steps 19, 25, and 31).

At block 508, the process 500 can include providing the access priority to a CBRS access point (AP) which controls access to the cell, wherein the access priority indicates to the CBRS AP a priority with which the UE is allowed to access the cell. For example, as shown in steps 20, 26, and 32, the access priority can be provided to the eNodeB 204 through the MME 206. The access priority can include a high priority, a low priority, or no access indication, where the access priority for the UE comprises the no access indication if the UE is authenticated to attach to the cell and one or more UEs of functional groups with higher priority consume the traffic load of the cell. In some examples, the no access indication is temporary for a period of time until the traffic load of the cell decreases.

In some examples, the DNA appliance can receive a user profile and subscription information associated with the UE from one or more authentication, authorization, and accounting (AAA) servers of the private LTE network such as the CBRS AAA 212 server and an enterprise AAA server 210.

Figure 6:
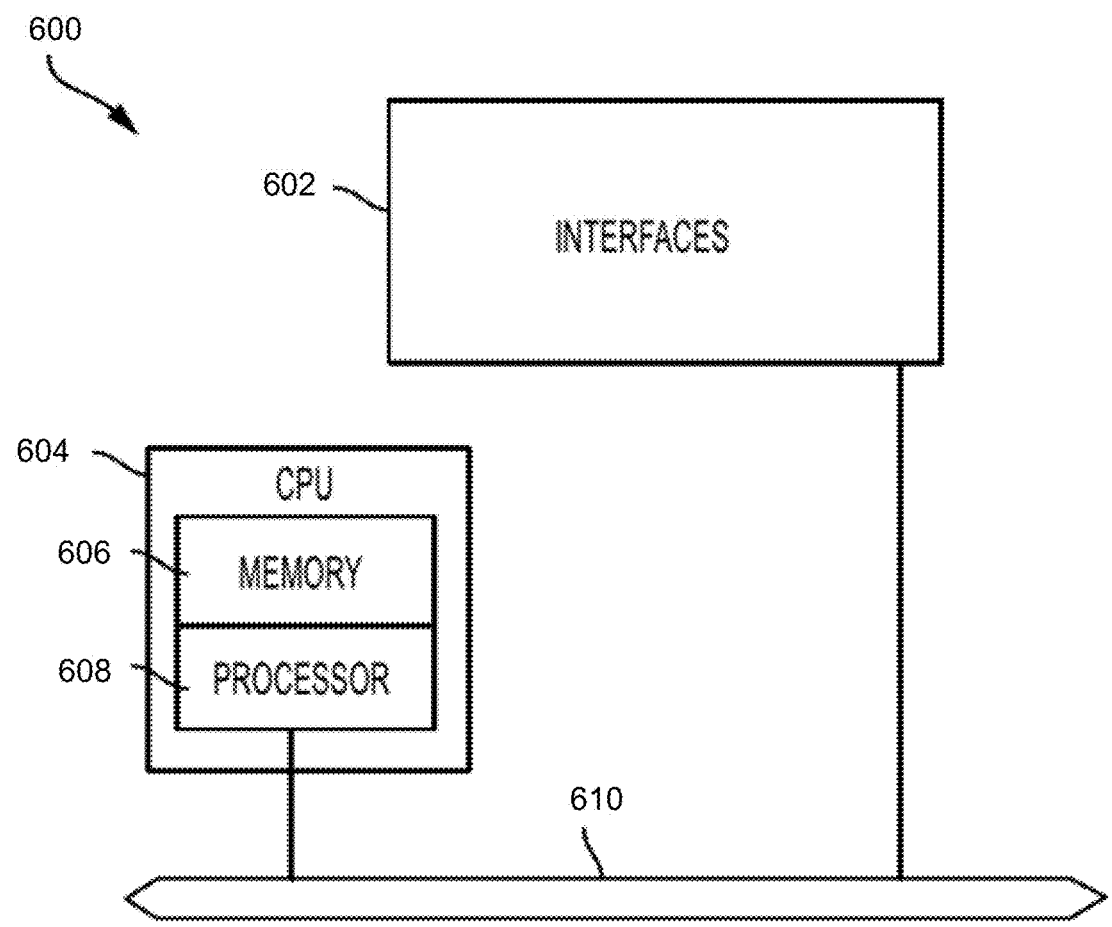
FIG. 6 illustrates an example network device in accordance with various examples.

FIG. 6 illustrates an example network device 600 suitable for implementing policy agents and performing switching, routing, and other networking operations. The network device 600 includes a central processing unit (CPU) 604, interfaces 602, and a connection 610 (e.g., a PCI bus). When acting under the control of appropriate software or firmware, the CPU 604 is responsible for executing packet management, error detection, and/or routing functions. The CPU 604 preferably accomplishes all these functions under the control of software including an operating system and any appropriate applications software. The CPU 604 may include one or more processors 608, such as a processor from the INTEL X86 family of microprocessors. In some cases, the processor 608 can be specially designed hardware for controlling the operations of the network device 600. In some cases, a memory 606 (e.g., non-volatile RAM, ROM, etc.) also forms part of the CPU 604. However, there are many different ways in which memory could be coupled to the system.

The interfaces 602 are typically provided as modular interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 604 to efficiently perform routing computations, network diagnostics, security functions, etc.

Although the system shown in FIG. 6 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 600.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 606 could also hold various software containers and virtualized execution environments and data.

The network device 600 can also include an application-specific integrated circuit (ASIC) which can be configured to perform routing and/or switching operations. The ASIC can communicate with other components in the network device 600 via the connection 610, to exchange data and signals and coordinate various types of operations by the network device 600, such as routing, switching, and/or data storage operations, for example.

Figure 7:
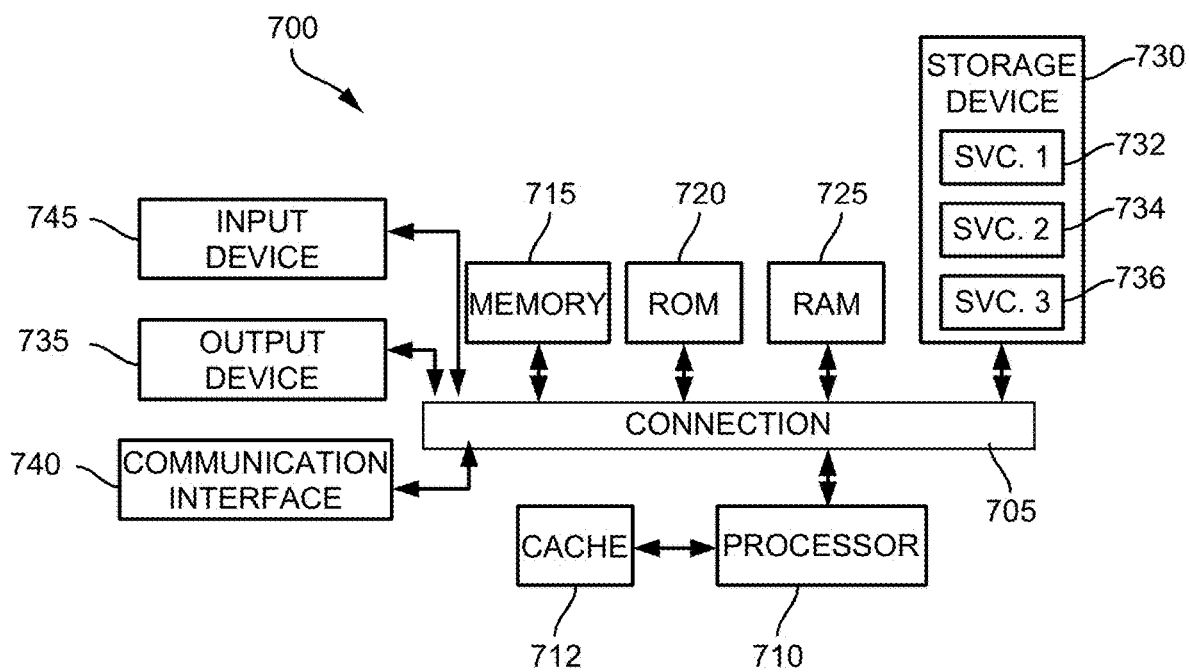
FIG. 7 illustrates an example computing device in accordance with various examples.

FIG. 7 illustrates an architecture of a computing system 700 wherein the components of the system 700 are in electrical communication with each other using a connection 705, such as a bus. The example system 700 includes a processing unit (CPU or processor) 710 and a system connection 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the actual processor design. The processor 710 may be a completely self-contained computing system, containing multiple cores or processors, a bus, memory controller, cache, etc. A multi-core processor may be symmetric or asymmetric.

To enable user interaction with the computing system 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing system 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include services 732, 734, 736 for controlling the processor 710. Other hardware or software modules are contemplated. The storage device 730 can be connected to the system connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
receiving, at a network device of a private Long Term Evolution (LTE) network operating in a Citizens Broadband Radio Service (CBRS) spectrum, a first functional group associated with a user equipment (UE);
assigning, to the first functional group, a first priority to access a first cell of the private LTE network, the first priority being different than a second priority of the first functional group to access a second cell of the private LTE network and a third priority of a second functional group to access the second cell;
mapping the first functional group to a second cell identifier of the second cell and the second priority to access the second cell;
mapping the second functional group to the first cell identifier of the first cell and a fourth priority to access the first cell, the fourth priority being different than the first priority;
mapping the second functional group to the second cell identifier of the second cell and the third priority to access the second cell, the third priority being different than the second priority;
receiving, at the network device, a traffic load of the first cell of the private LTE network;
determining, for the first functional group, an access priority for the UE to access the first cell, the access priority being based on the first priority to access the first cell and the traffic load; and
providing the access priority to a CBRS access point (AP) which controls access to the first cell, wherein the access priority indicates to the CBRS AP a cell-specific priority with which the UE is allowed to access the first cell.

2. The method of claim 1, wherein the access priority comprises a high priority, a low priority, or a no access indication.

3. The method of claim 2, wherein the access priority for the UE comprises the no access indication if the UE is authenticated to attach to the first cell and one or more UEs of functional groups with higher priority consume the traffic load of the first cell.

4. The method of claim 3, wherein the no access indication is temporary for a period of time until the traffic load of the cell decreases.

5. The method of claim 1, wherein providing the access priority to the CBRS AP includes providing the access priority to a mobility management entity (MME) of the private LTE network, wherein the first functional group is received from the MME based on the UE establishing a request to attach to the first cell.

6. The method of claim 1, wherein the network device is a Digital Network Architecture (DNA) appliance of the private LTE network.

7. The method of claim 1, further comprising receiving a user profile and subscription information associated with the UE from one or more authentication, authorization, and accounting (AAA) servers of the private LTE network.

8. The method of claim 7, wherein the one or more AAA servers comprise a CBRS AAA server and an enterprise AAA server.

9. A system, comprising:
one or more processors; and
a non-transitory computer-readable storage medium containing instructions which, when executed by the one or more processors, cause the one or more processors to:
receive, at a network device of a private Long Term Evolution (LTE) network operating in a Citizens Broadband Radio Service (CBRS) spectrum, a first functional group associated with a user equipment (UE);
assign, to the first functional group, a first priority to access a first cell of the private LTE network, the first priority being different than a second priority of the first functional group to access a second cell of the private LTE network and a third priority of a second functional group to access the second cell;
map the first functional group to a second cell identifier of the second cell and the second priority to access the second cell;
map the second functional group to the first cell identifier of the first cell and a fourth priority to access the first cell, the fourth priority being different than the first priority;
map the second functional group to the second cell identifier of the second cell and the third priority to access the second cell, the third priority being different than the second priority;
receive, at the network device, a traffic load of the first cell of the private LTE network;
determine, for the first functional group, an access priority for the UE to access the first cell, the access priority being based on the first priority to access the first cell and the traffic load; and
provide the access priority to a CBRS access point (AP) which controls access to the first cell, wherein the access priority indicates to the CBRS AP a cell-specific priority with which the UE is allowed to access the first cell.

10. The system of claim 9, wherein the access priority comprises a high priority, a low priority, or a no access indication.

11. The system of claim 10, wherein the access priority for the UE comprises the no access indication if the UE is authenticated to attach to the first cell and one or more UEs of functional groups with higher priority consume the traffic load of the first cell.

12. The system of claim 11, wherein the no access indication is temporary for a period of time until the traffic load of the first cell decreases.

13. The system of claim 9, wherein providing the access priority to the CBRS AP includes providing the access priority to a mobility management entity (MME) of the private LTE network, wherein the functional group is received from the MME based on the UE establishing a request to attach to the cell.

14. The system of claim 9, wherein the instructions which, when executed by the one or more processors, cause the one or more processors to receive a user profile and subscription information associated with the UE from one or more authentication, authorization, and accounting (AAA) servers of the private LTE network.

15. The system of claim 14, wherein the one or more AAA servers comprise a CBRS AAA server and an enterprise AAA server.

16. The system of claim 9, wherein the network device is a Digital Network Architecture (DNA) appliance of the private LTE network.

17. A non-transitory machine-readable storage medium, including instructions configured to cause a data processing apparatus to:
receive, at a network device of a private Long Term Evolution (LTE) network operating in a Citizens Broadband Radio Service (CBRS) spectrum, a first functional group associated with a user equipment (UE);
assign, to the first functional group, a first priority to access a first cell of the private LTE network, the first priority being different than a second priority of the first functional group to access a second cell of the private LTE network and a third priority of a second functional group to access the second cell;
map the first functional group to a second cell identifier of the second cell and the second priority to access the second cell;
map the second functional group to the first cell identifier of the first cell and a fourth priority to access the first cell, the fourth priority being different than the first priority;
map the second functional group to the second cell identifier of the second cell and the third priority to access the second cell, the third priority being different than the second priority;
receive, at the network device, a traffic load of the first cell of the private LTE network;
determine, for the first functional group, an access priority for the UE to access the first cell, the access priority being based on the first priority to access the first cell and the traffic load; and
provide the access priority to a CBRS access point (AP) which controls access to the first cell, wherein the access priority indicates to the CBRS AP a cell-specific priority with which the UE is allowed to access the first cell.

18. The non-transitory machine-readable storage medium of claim 17, wherein the access priority comprises a high priority, a low priority, or no access indication.

19. The non-transitory machine-readable storage medium of claim 18, wherein the access priority for the UE comprises the no access indication if the UE is authenticated to attach to the first cell and one or more UEs of functional groups with higher priority consume the traffic load of the first cell.

20. The non-transitory machine-readable storage medium of claim 19, wherein the no access indication is temporary for a period of time until the traffic load of the first cell decreases.

* * * * *